(12) United States Patent
Smith (10) Patent No.: US 11,852,074 B1
(45) Date of Patent: Dec. 26, 2023

(54) COMBINED CYCLE POWER PLANTS WITH EXHAUST GAS RECIRCULATION INTERCOOLING

(71) Applicant: GENERAL ELECTRIC COMPANY, Schenectady, NY (US)

(72) Inventor: Raub Warfield Smith, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/863,011

(22) Filed: Jul. 12, 2022

(51) Int. Cl.
| | |
|---|---|
| F02C 7/18 | (2006.01) |
| F01K 23/10 | (2006.01) |
| F02C 3/34 | (2006.01) |
| F02C 7/143 | (2006.01) |

(52) U.S. Cl.
CPC ............ F02C 7/185 (2013.01); F01K 23/101 (2013.01); F02C 3/34 (2013.01); F02C 7/143 (2013.01); *F05D 2220/31* (2013.01); *F05D 2220/32* (2013.01); *F05D 2220/62* (2013.01); *F05D 2220/72* (2013.01); *F05D 2260/213* (2013.01)

(58) Field of Classification Search
CPC .. F02C 3/34; F02C 7/185; F02C 7/143; F02C 1/08; F02C 1/008; F01K 23/10; F01K 23/101; F23C 2202/00; F23C 2202/30; F05D 2260/211
See application file for complete search history.

(56) References Cited

U.S. PATENT DOCUMENTS

| | | | | |
|---|---|---|---|---|
| 6,256,976 B1 * | 7/2001 | Kataoka | ................... | F02C 7/08 60/39.52 |
| 6,363,709 B2 * | 4/2002 | Kataoka | ................... | F02C 9/18 60/39.52 |
| 6,598,402 B2 * | 7/2003 | Kataoka | ................. | F02C 3/305 60/39.52 |
| 8,117,825 B2 | 2/2012 | Griffin et al. | | |
| 8,171,718 B2 * | 5/2012 | Gulen | ....................... | F02C 6/18 60/39.52 |
| 9,217,367 B2 * | 12/2015 | Sander | ...................... | F02C 3/34 |
| 9,617,914 B2 | 4/2017 | Minto et al. | | |
| 9,670,841 B2 * | 6/2017 | Mittricker | ............... | F02C 7/141 |
| 9,810,050 B2 * | 11/2017 | Sites | ........................ | F02C 3/22 |
| 9,869,246 B2 | 1/2018 | Benz et al. | | |
| 9,885,290 B2 * | 2/2018 | Della-Fera | ............... | F02C 3/34 |
| 10,215,059 B2 * | 2/2019 | Mohr | ........................ | F02C 9/16 |

(Continued)

*Primary Examiner* — Alain Chau
(74) *Attorney, Agent, or Firm* — Armstrong Teasdale LLP (57) ABSTRACT

A combined cycle power plant includes a gas turbine engine that includes a compressor having a compressor inlet, a compressor outlet, and an interstage inlet defined therebetween. The turbine also includes a turbine outlet configured to discharge a first exhaust gas stream therefrom. A heat recovery steam generator is configured to receive the first exhaust gas stream, extract heat from the first exhaust gas stream, and discharge a second exhaust gas stream therefrom. Either a recirculation compressor pressurizes a first portion of the second exhaust gas stream for recirculation towards the compressor interstage inlet, or an admission compressor pressurizes an air stream directed towards the compressor interstage inlet. A first cooler cools the stream directed to the compressor, thereby defining a cooled stream, wherein the first cooler provides the cooled stream to the interstage inlet of the compressor.

20 Claims, 6 Drawing Sheets

(56) References Cited

U.S. PATENT DOCUMENTS

| | | | |
|---|---|---|---|
| 10,570,825 B2* | 2/2020 | Huntington | F02C 1/08 |
| 10,738,711 B2* | 8/2020 | Della-Fera | F01D 17/08 |
| 10,865,710 B2 | 12/2020 | Wang et al. | |
| 2010/0058758 A1* | 3/2010 | Gilchrist, III | F02C 3/34 |
| | | | 60/624 |
| 2011/0079017 A1* | 4/2011 | Gulen | F02C 7/18 |
| | | | 60/783 |
| 2011/0289898 A1* | 12/2011 | Hellat | F01K 23/10 |
| | | | 60/39.23 |
| 2012/0137698 A1* | 6/2012 | Sjodin | F01K 23/10 |
| | | | 60/774 |
| 2013/0047576 A1* | 2/2013 | Sander | F02C 3/34 |
| | | | 60/39.182 |
| 2014/0000271 A1* | 1/2014 | Mittricker | F02C 7/141 |
| | | | 60/726 |
| 2014/0000273 A1* | 1/2014 | Mittricker | F02C 3/34 |
| | | | 60/773 |
| 2014/0020398 A1* | 1/2014 | Mittricker | F02C 7/141 |
| | | | 60/39.52 |
| 2014/0116023 A1* | 5/2014 | Anand | F02C 3/34 |
| | | | 60/39.52 |
| 2014/0250908 A1* | 9/2014 | Huntington | F01K 13/02 |
| | | | 60/776 |
| 2014/0338901 A1* | 11/2014 | Sites | E21B 43/16 |
| | | | 166/268 |
| 2015/0377146 A1* | 12/2015 | Della-Fera | F02C 1/08 |
| | | | 60/39.52 |
| 2018/0156136 A1* | 6/2018 | Della-Fera | F02C 3/34 |
| 2018/0347407 A1* | 12/2018 | Mohr | F02C 9/16 |

\* cited by examiner

COMBINED CYCLE POWER PLANTS WITH EXHAUST GAS RECIRCULATION INTERCOOLING

BACKGROUND

The present disclosure relates generally to power generation systems and, more specifically, to systems that use cooled air or recirculated exhaust gas for compressor intercooling.

Gas turbine systems are used to generate power, and typically include a compressor, a combustor, and a turbine. Operation of the gas turbine system at higher operating temperature generally results in increased performance, efficiency, and power output. As such, during operation various gas path components in the system may be subjected to high temperature flows. Over time, continued exposure to high temperature flows may unduly strain the components and/or reduce their service life. Thus, at least some known gas turbine components that are subjected to high temperature flows are cooled to enable the gas turbine system to continue to operate at the increased temperatures. For example, some components may be provided with compressor bleed air, and the like, for cooling purposes. However, any air compressed in the compressor and not used to generate combustion gases generally reduces the overall efficiency of the gas turbine system.

BRIEF DESCRIPTION

In one aspect, a combined cycle power plant including a gas turbine engine, which includes a compressor having a compressor inlet, a compressor outlet, and an interstage inlet defined therebetween and a turbine outlet oriented to discharge a first exhaust gas stream therefrom is provided. A heat recovery steam generator receives the first exhaust gas stream therein, extracts heat from the first exhaust gas stream, and discharges a second exhaust gas stream therefrom. A recirculation compressor pressurizes a first portion of the second exhaust gas stream for recirculation towards the compressor, and a first cooler cools the first portion of the second exhaust gas stream after compression, thereby defining a cooled exhaust gas stream, wherein the first cooler discharges the cooled exhaust gas stream to the interstage inlet of the compressor.

In another aspect, a gas turbine assembly including a gas turbine engine is provided. The gas turbine engine includes a compressor having a compressor inlet, a compressor outlet, and an interstage inlet defined therebetween, The gas turbine engine further comprising a turbine outlet oriented to discharge a first exhaust gas stream therefrom. An admission compressor pressurizes a stream channeled towards the compressor. A first cooler cools the compressed flow discharged from the admission compressor, thereby defining a pressurized cooled stream, wherein the first cooler discharges the pressurized cooled stream to the interstage inlet of the compressor.

In a further aspect, a combined cycle power plant including a gas turbine engine, which includes a compressor having a compressor inlet, a compressor outlet, and an interstage inlet defined therebetween and a turbine outlet configured to discharge a first exhaust gas stream therefrom is provided. A heat recovery steam generator receives the first exhaust gas stream therein, extracts heat from the first exhaust gas stream, and discharges a second exhaust gas stream therefrom. At least one of a recirculation compressor that pressurizes a first portion of the second exhaust gas stream for recirculation towards the compressor, and an admission compressor that pressurizes an ambient airflow stream towards the compressor. A first cooler cools at least one of the ambient airflow stream or the first portion of the second exhaust gas stream, thereby defining a cooled exhaust gas stream, wherein the first cooler discharges the cooled exhaust gas stream to the interstage inlet of the compressor.

DETAILED DESCRIPTION

The embodiments described herein relate to power generation systems that use injected cooled air or recirculated exhaust gases for compressor intercooling. While exhaust gas recirculation is traditionally provided to the inlet of a gas turbine, the systems described herein compress the recirculated exhaust gases to enable it to be channeled into an interstage compressor admission after the gases have been cooled. This effectively turns a simple Brayton cycle engine into an intercooled one. Alternatively, boosted and cooled ambient air may be provided to the compressor interstage admission.

Benefits of derived compressor interstage admission of cooled ambient air or recirculated exhaust gas admission to a gas turbine include: a) power augmentation from the reduction in working fluid temperature from the admission of the cooled stream, as well as a reduction in compressor exit temperature, the combination of which enables more fuel to be burned; b) a reduction in the physical size of exhaust recirculation piping/duct-work versus recirculation to the compressor inlet, thus reducing costs and facilitating an ease of exhaust line routing; c) a reduced gas temperature within, and at the discharge of, the compressor, thereby reducing rotor temperatures and extending a useful life of gas turbine rotor and hot gas path components; and d) usefulness in conventional gas turbine combined cycle systems without exhaust gas recirculation by channeling aftercooled ambient air rather than exhaust gases into the boost compressor, particularly useful for any engine with compressor discharge limits and/or any turbines operating in environments where hot day output is valuable.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
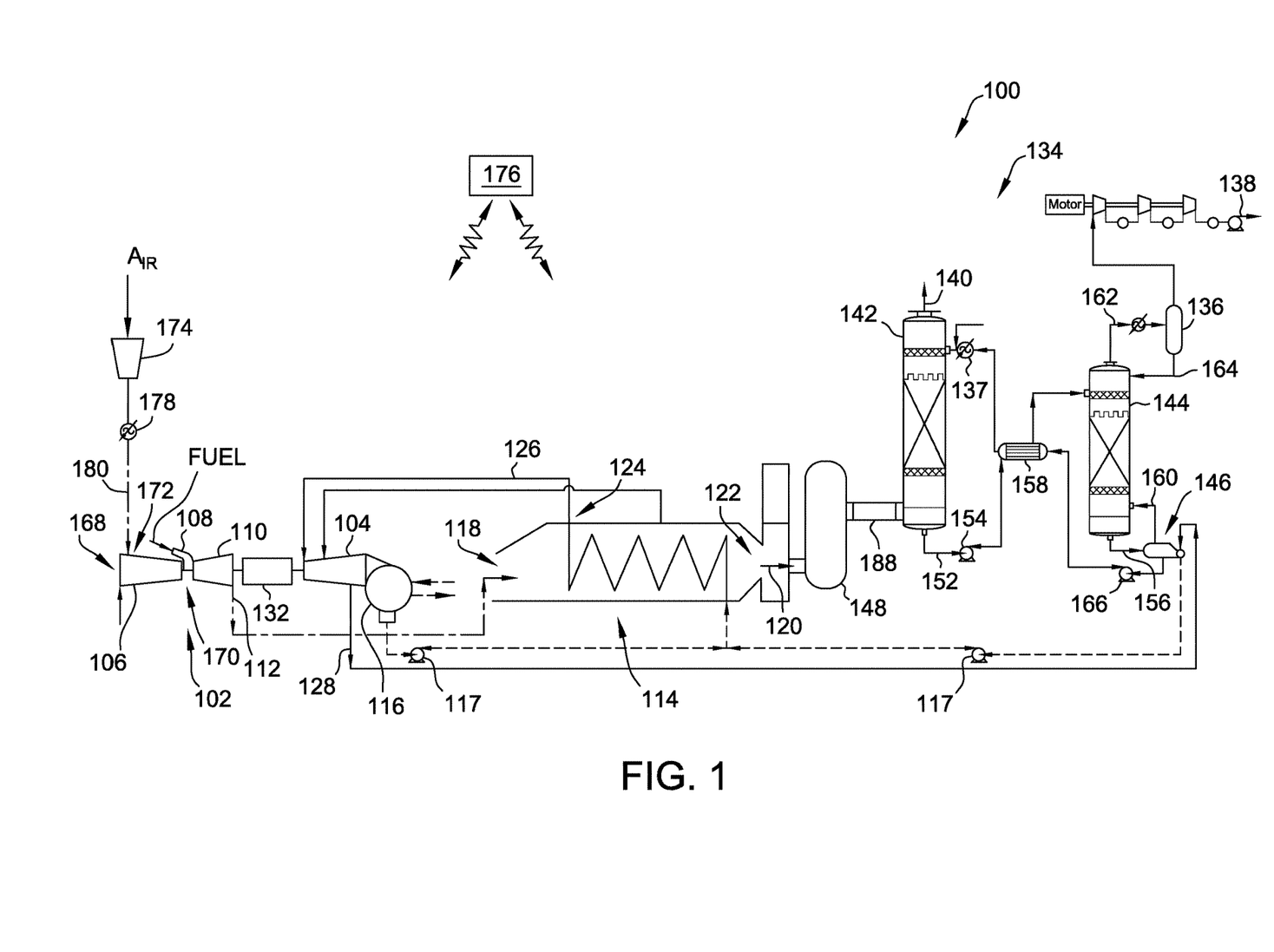
FIG. 1 is a schematic illustration of an exemplary combined cycle power plant including an exemplary gas turbine assembly.

FIG. 1 is a schematic illustration of an exemplary combined cycle power plant 100. In the exemplary embodiment, power plant 100 includes a gas turbine assembly 102 and a steam turbine 104. Gas turbine assembly 102 includes a compressor 106, a combustor 108, and a turbine 110 coupled together in a serial flow relationship. In operation, combustor 108 receives air from compressor section 106 and fuel from a fuel supply and mixes the fuel and air to create a fuel-air mixture that is combusted to generate combustion gases. Combustion gases are channeled through turbine 110 and discharged from turbine 110 as a first exhaust gas stream 112. In the exemplary embodiment, power plant 100 also includes a steam cycle arrangement including a heat recovery steam generator (HRSG) 114 and steam turbine 104. In some embodiments, the steam cycle arrangement may also include other components, including a condenser 116 and at least one circulation pump 117. Moreover, in other embodiments, the steam cycle arrangement may also include at least one additional HRSG 114.

In the exemplary embodiment, HRSG 114 includes an inlet 118 that receives first exhaust gas stream 112 from gas turbine assembly 102. Heat is extracted from first exhaust gas stream 112, and a second exhaust gas stream 120 is discharged from a first outlet 122. Second exhaust gas stream 120 is at a lower temperature than a temperature of first exhaust gas stream 112 entering inlet 118. HRSG 114 also includes a second outlet 124 that discharges a first steam stream 126. Steam turbine 104 receives first steam stream 126 and subsequently discharges an interstage extraction flow 128 therefrom. Any steam not extracted with flow 128 continues expansion to condensation within condenser 116. In some embodiments, steam turbine 104 may include additional steam admissions from HRSG 114. In the exemplary embodiment, gas turbine assembly 102 and steam turbine 104 are both coupled to a generator 132 that produces power using working fluids flowing through each. Alternatively, turbine assembly 102 and steam turbine 104 may be on separate shafts, with each coupled to a separate generator.

In the exemplary embodiment, power plant 100 also includes a carbon capture system 134. During operation, carbon capture system 134 produces a carbon dioxide stream 138. Carbon capture system 134 may include one or more separators, either used alone, or in combination with other separation processes, such as carbon dioxide selective membrane technologies, absorption processes, diaphragms, and the like. An exhaust stream or carbon depleted exhaust stream 140 may be discharged from carbon capture system 134 to the ambient environment. Exhaust stream 140 may also be further processed prior to discharge to the environment or elsewhere. At least a portion of carbon dioxide stream 138 may be increased to supercritical pressure for transport and/or storage, for example.

Carbon capture system 134 generally includes an absorber 142, a stripper 144, and a stripper reboiler 146. In operation, second exhaust gas stream 120 discharged from HRSG 114 is channeled towards absorber 142. The exhaust gas may be pretreated for removal of particulates and impurities such as SOx and NOx before entry into absorber 142. In addition, in the exemplary embodiment, a first cooler 148 is coupled between HRSG 114 and carbon capture system 134. Alternatively, carbon capture system 134 may include at least one booster blower (not shown) to pressurize flow channeled towards carbon capture system 134. First cooler 148 may be, but is not limited to only being, a quench tower. First cooler 148 cools a portion of second exhaust gas stream 120 to be channeled towards carbon capture system 134. A solvent 152, rich in carbon dioxide, is discharged from absorber 142 and is then channeled, via a pump 154, to stripper 144. A solvent 156, lean in carbon dioxide, is discharged from stripper 144 and is channeled back to an upper portion of absorber 142 via reboiler 146, a pump 166, and heat exchanger 158. Absorber 142 may be of any construction typical for providing gas-liquid contact and absorption. Absorber 142 and stripper 144 may incorporate a variety of internal components, such as trays, packings, and/or supports, for example. In one embodiment, absorber 142 absorbs carbon dioxide via a countercurrent flow from the entering exhaust gas. Stripper 144 removes carbon dioxide from solvent 152. Absorber 142 and stripper 144 may be variably sized based on an amount of carbon dioxide to be removed, and may be sized according to various engineering design equations. Furthermore, a single stripper 144 may serve and be coupled to multiple absorbers 142.

The solvent may be a solution or dispersion, typically in water, of one or more absorbent compounds. More specifically, the solvent may be any compound which when mixed with water creates an absorbent fluid that, as compared to water alone, increases the ability of the fluid to preferentially remove carbon dioxide from exhaust gas. For example, the solvent may be, but is not limited to only being, monethanolamine (MEA). Inhibitors may be included in the solvent to inhibit degradation of the solvent.

In the exemplary embodiment, solvent 152 is preheated in a countercurrent heat exchanger 158 against solvent 156, and is subsequently channeled to stripper 144. Stripper 144 is a pressurized unit in which carbon dioxide is recovered from solvent 152. Stripper 144 generally incorporates reboiler 146 which receives a portion of solvent 156 exiting stripper 144. Reboiler 146 vaporizes solvent 156 and channels solvent vapor 160 back to stripper 144 to facilitate increased carbon dioxide separation. A single stripper may be coupled to more than one reboiler 146. Reboiler 146 receives steam, such as from steam turbine 104 via stream 128 to provide heating duty in reboiler 146.

Vapor 162 exiting stripper 144 is partially condensed in a condenser 136. The condensed portion of vapor 162 is returned to stripper 144 as reflux 164. Reflux 164 may be transferred through an accumulator (not shown) and a pump (not shown) before entry into stripper 144. Carbon dioxide stream 138 is removed from condenser 136 for transport and/or storage after compression.

In the exemplary embodiment, compressor 106 includes an inlet 168, an outlet 170, and an interstage inlet 172 defined therebetween. Power plant 100 includes an admission compressor 174 and a controller 176. Depending on its use in plant 100, admission compressor 174 may be configured for use as a recirculation compressor. In the exemplary embodiment, a cooler 178, also known as an aftercooler, is coupled between admission compressor 174 and interstage inlet 172. Cooler 178 cools the pressurized air discharged from compressor 174 to define a cooled admission stream 180. More specifically, cooler 178 discharges cooled stream 180 towards interstage inlet 172 to facilitate improving the performance of plant 100, as described herein.

However, power consumption from the operation of any booster blowers and/or compressor 174 will reduce plant output. The interstage cooling provided to compressor 106 by compressor 174 and its aftercooler 178, facilitates improving the output of power plant 100 by reducing compression work in compressor 106 and by enabling more fuel to be combusted in combustor 108.

For example, controller 176 may monitor the power consumption of any booster blower and/or compressor 174, (and any large auxiliaries in a particular plant) and may also determine steam cycle losses resulting from discharging steam stream 128 towards carbon capture system 134, for example. Controller 176 may also dynamically determine the power consumption and steam cycle losses, and adjust operation of power plant 100 accordingly. Accordingly, in one embodiment, operation of any booster blower, and/or compressor 174 (and/or any other large auxiliary loads) is adjusted by controller 176 to facilitate improving plant output to a level that overcomes power consumption and steam cycle losses. That is, controller 176 may selectively modulate the flow of any stream channeled into compressor 106 as described herein, to provide an improvement to the output of power plant. In one exemplary embodiment, plant output boost should be increased by at least about 5% to about 10% using the cooled injection versus the providing about the same exhaust gas flow recirculation to the gas turbine inlet. Moreover, because the temperature of compressor exhaust discharge can be more easily controlled, bigger performance gains are possible on hot days where the temperature of compressor exhaust discharge can typically be limiting in at least some known power generation systems.

One exemplary gas turbine parameter that may be monitored to determine improvements in gas turbine output is compressor discharge temperature. In the exemplary embodiment, power plant 100 includes a sensor (not shown) coupled at outlet 170 for use in monitoring the temperature of the compressed gas discharged therefrom. Controller 176 may then modulate cooled stream 180 provided to interstage inlet 172 to maintain the compressor discharge temperature within a predefined temperature range. Controller 176 facilitates extending the useful life of components within power plant 100. Thus, the flow modulation provides an option for operators of power plant 100 to use when determining how to optimize performance of power plant 100.

It should be noted that gas turbine assembly 102 may be used independently of HRSG 114 and carbon capture system 134. In other words, turbine assembly 102 may be operated as a simple gas turbine assembly 102 that uses cooled interstage air admission provided via admission compressor 174 and cooler 178. More specifically, in the exemplary embodiment, when turbine assembly 102 is used as a stand-alone, simple cycle gas turbine, assembly 102 operates with cooled interstage air admission, and without inlet boost (shown on FIG. 2 and FIG. 3).

The operation of gas turbine assembly 102 as a simple gas turbine facilitates eliminating a need for higher-cost rotor alloys or additional cooling air, and rather enables the use of steel compressor wheels, especially in operating conditions, such as hot days, where compressor exit air temperatures tend to be highest. In addition, the physical size and cost of cooler 178 is relatively modest in comparison to known power plant systems used to chill air flow to gas turbine inlets because the airflow is lower and the operating temperature of flow entering cooler 178 is higher in relation to the heat sink (ambient). Moreover, admission air facilitates power augmentation because the admission air facilitates reducing work required of compressor 106 while still reducing compressor exhaust discharge temperature.

Figure 2:
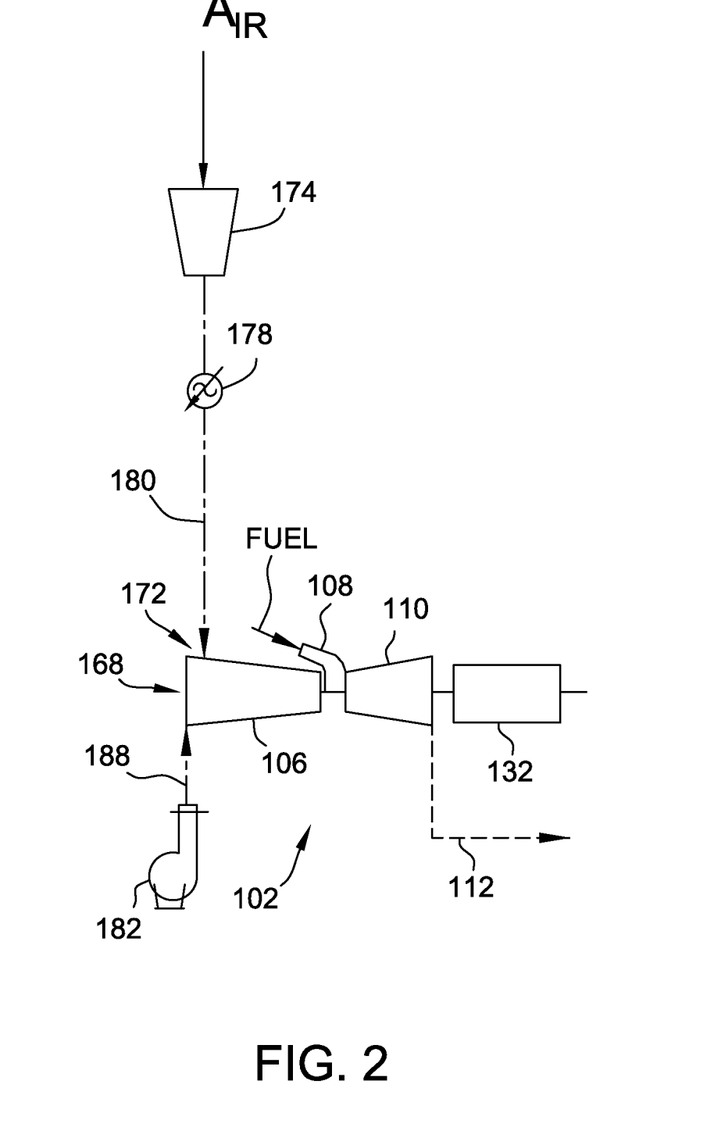
FIG. 2 is a schematic illustration of an alternative gas turbine assembly that may be used with the combined cycle power plant shown in FIG. 1.

FIG. 2 is a schematic illustration of an alternative gas turbine assembly 102 that may be used with combined cycle power plant 100 (shown in FIG. 1.) Unlike the embodiment of FIG. 1, which illustrates an un-boosted gas turbine assembly 102, in FIG. 2, in the exemplary embodiment of FIG. 2, gas turbine assembly 102 utilizes an external inlet boost blower 182. More specifically, in the exemplary embodiment, external air boost blower 182 pressurizes an airflow stream 188 channeled into inlet 168 of compressor 106. Boost blower 182 can be used to supercharge gas turbine assembly 102 such that enhanced or improved gas turbine output is facilitated. In addition, the combination of boost blower 182 and cooled admission stream 180 suppled to compressor 106 enables controller 176 (shown in FIG. 1) to provide enhanced control of the discharge temperature of compressor 106, thus increasing power augmentation potential from turbine assembly 102.

Figure 3:
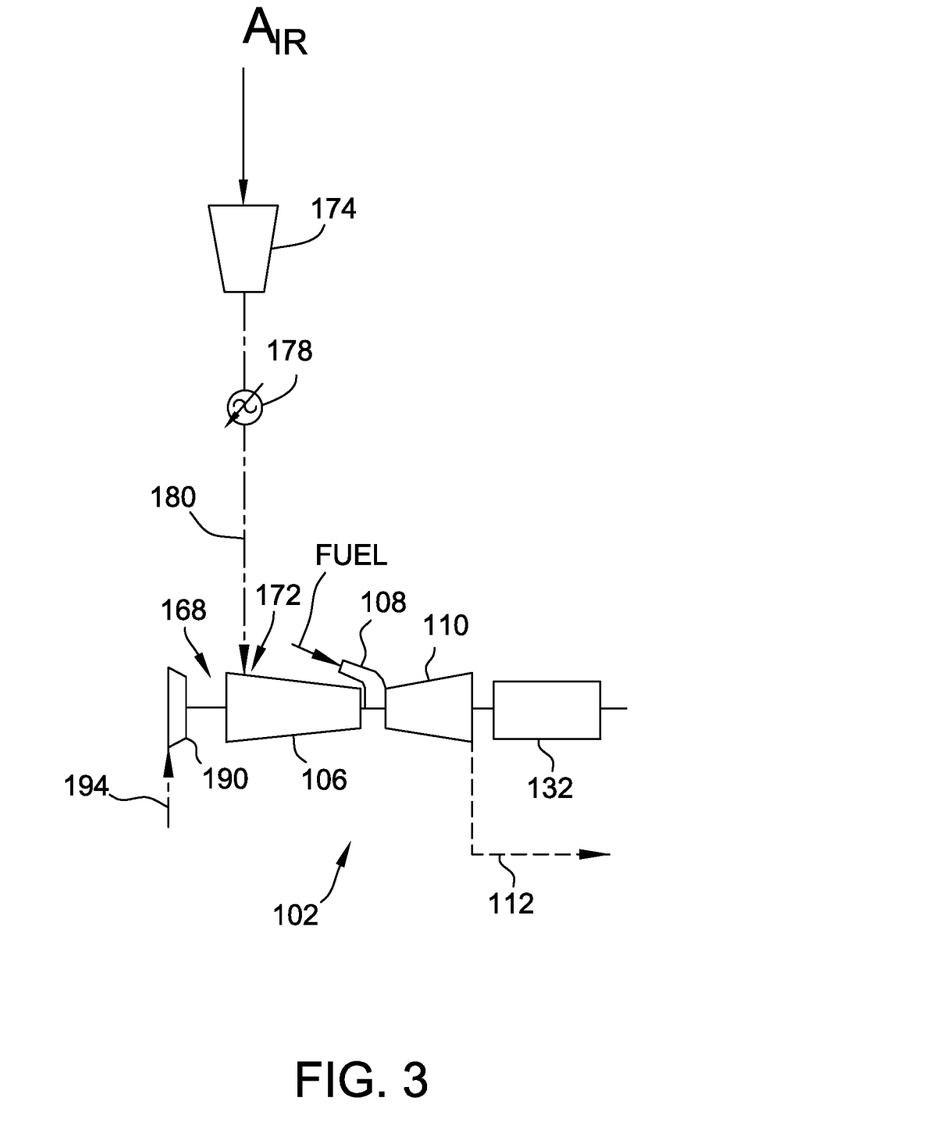
FIG. 3 is a schematic illustration of another alternative gas turbine assembly that may be used with the combined cycle power plant shown in FIG. 1.

FIG. 3 is a schematic illustration of a another alternative gas turbine assembly 102 that may be used with combined cycle power plant 100 (shown in FIG. 1). Unlike the embodiment of FIG. 1, which illustrates an un-boosted gas turbine assembly 102, and the embodiment in FIG. 2, which illustrates an external boost blower, in the exemplary embodiment of FIG. 3, gas turbine assembly utilizes a shaft-driven boost compressor 190. More specifically, in the exemplary embodiment, turbine assembly includes a shaft-driven, inlet boost compressor 190 that pressurizes an ambient airflow stream 194 channeled towards interstage inlet 172 of compressor 106. Similar to boost blower 182 (shown in FIG. 2), compressor 190 may be used to supercharge gas turbine assembly 102. However, compressor 190 is capable of providing an increased supercharged flow to gas turbine assembly 102 as compared to boost blower 182. The increased supercharge facilitates enhancing the gas turbine output over even that of boost blower 182. The combination of compressor 190 and cooled admission stream 180 suppled to compressor 106 enables controller 176 (shown in FIG. 1) to provide enhanced control of the discharge temperature of compressor 106, thus increasing power augmentation potential from turbine assembly 102.

It should be noted that any of the gas turbine assemblies shown in FIGS. 1-3 may be used with or without carbon capture system 134. Moreover, in some embodiments, any of the gas turbine assemblies 102 described herein may be used with recirculated exhaust gas admission, i.e., compressed aftercooled exhaust flow, rather than compressed aftercooled admission stream 180. In such embodiments, the recirculated exhaust gas may be routed from downstream or upstream of first cooler.

Figure 4:
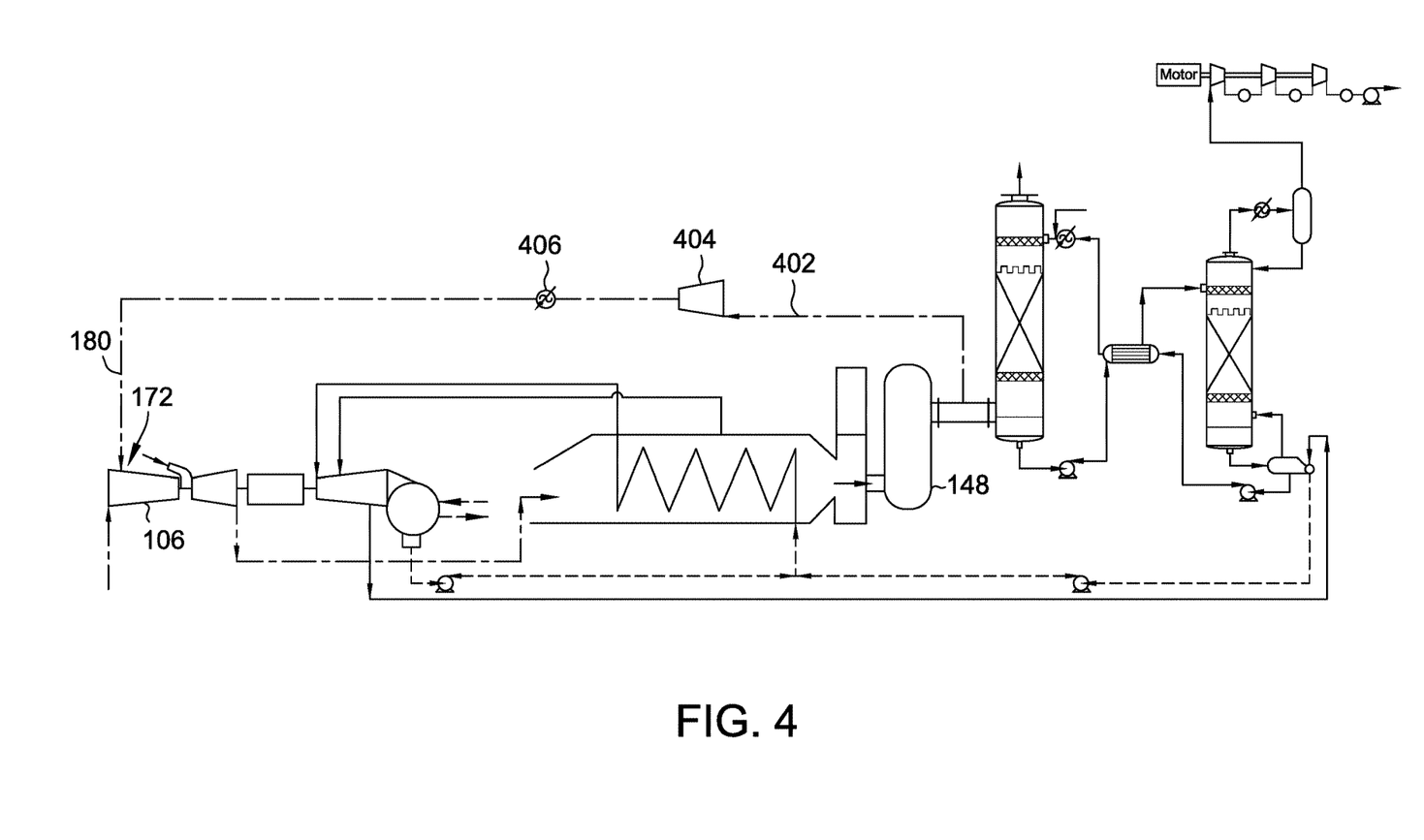
FIG. 4 is a schematic illustration of an alternative combined cycle power plant including a gas turbine assembly.

FIG. 4 is a schematic illustration of an alternative combined cycle power plant 100 (shown in FIG. 1) including gas turbine assembly 102. The embodiment illustrated in FIG. 4 is similar to the embodiment illustrated in FIG. 1, with the differences noted herein, below, and as such, the same reference numbers are used in FIG. 4 as were used in FIG. 1. In FIG. 4, plant 100 utilizes exhaust gas recirculation 402 with post combustion carbon capture system 134. An exhaust gas recirculation stream 402 is drawn downstream from first cooler 148 and is channeled towards an exhaust gas recirculation compressor 404.

A cooler 406 is coupled between recirculation compressor 404 and interstage inlet 172. Cooler 406 cools the pressurized air discharged from compressor 404 to define a cooled admission stream 180. More specifically, cooler 406 discharges cooled stream 180 towards interstage inlet 172 to facilitate improving the performance of plant 100, as described herein. In the exemplary embodiment, because stream 402 is drawn from downstream from cooler 148, the exhaust stream has been scrubbed and cooled and as such compression power for the recirculation compressor 404 is facilitated to be reduced, as well as after cooling needed to facilitate control of compressor discharge temperature.

In the exemplary embodiment, wherein compressed aftercooled air is suppled to interstage inlet 172, the pressurized air stream 180 is clean and as such, cooler 406 and admission compressor 404 may be physically located relatively close to cooler 148 such that piping diameter for steam 180 and plant costs are facilitated to be reduced. In embodiments wherein an existing plant is retrofitted, compressor 106 may be configured to use exhaust gas discharged from compressor 404. In such embodiments, assembly 102 not only gains the benefits described above, but also gains those performance benefits typically associated with exhaust gas recirculation including, but not limited to, vitiated combustion, higher exhaust carbon dioxide emissions, and lower nitrous oxide emissions, for example. Moreover, in the exemplary embodiment, the combination of the operation and pressurization of gas turbine assembly 102 and HRSG system 114 facilitates overcoming the draft losses through the cooler, i.e., quench tower 148, and carbon capture system 134. In other alternative embodiments, a booster fan may be used within carbon capture system 134 depending on equipment and plant design constraints, and economic considerations.

Figure 5:
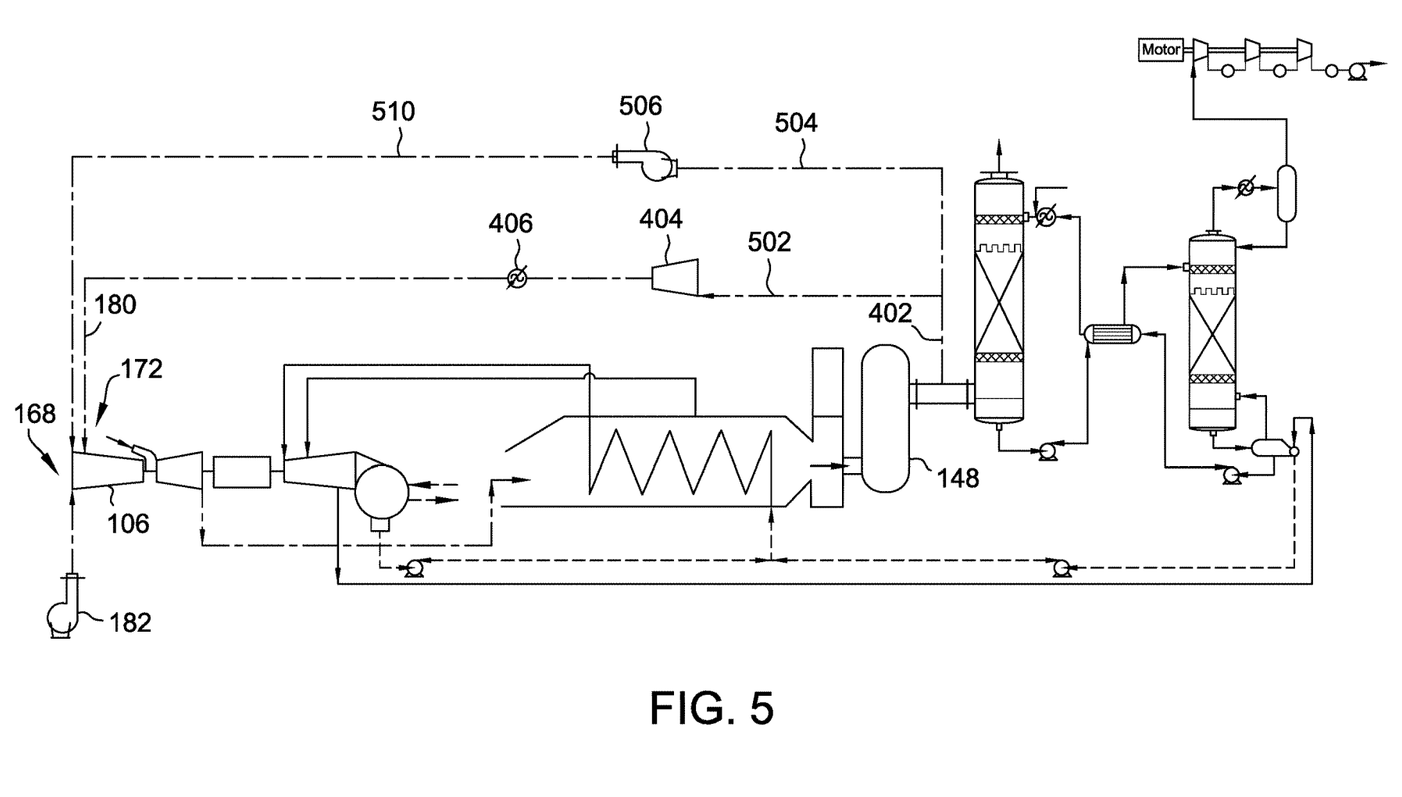
FIG. 5 is a schematic illustration of another alternative combined cycle power plant including a gas turbine assembly.
Figure 6:
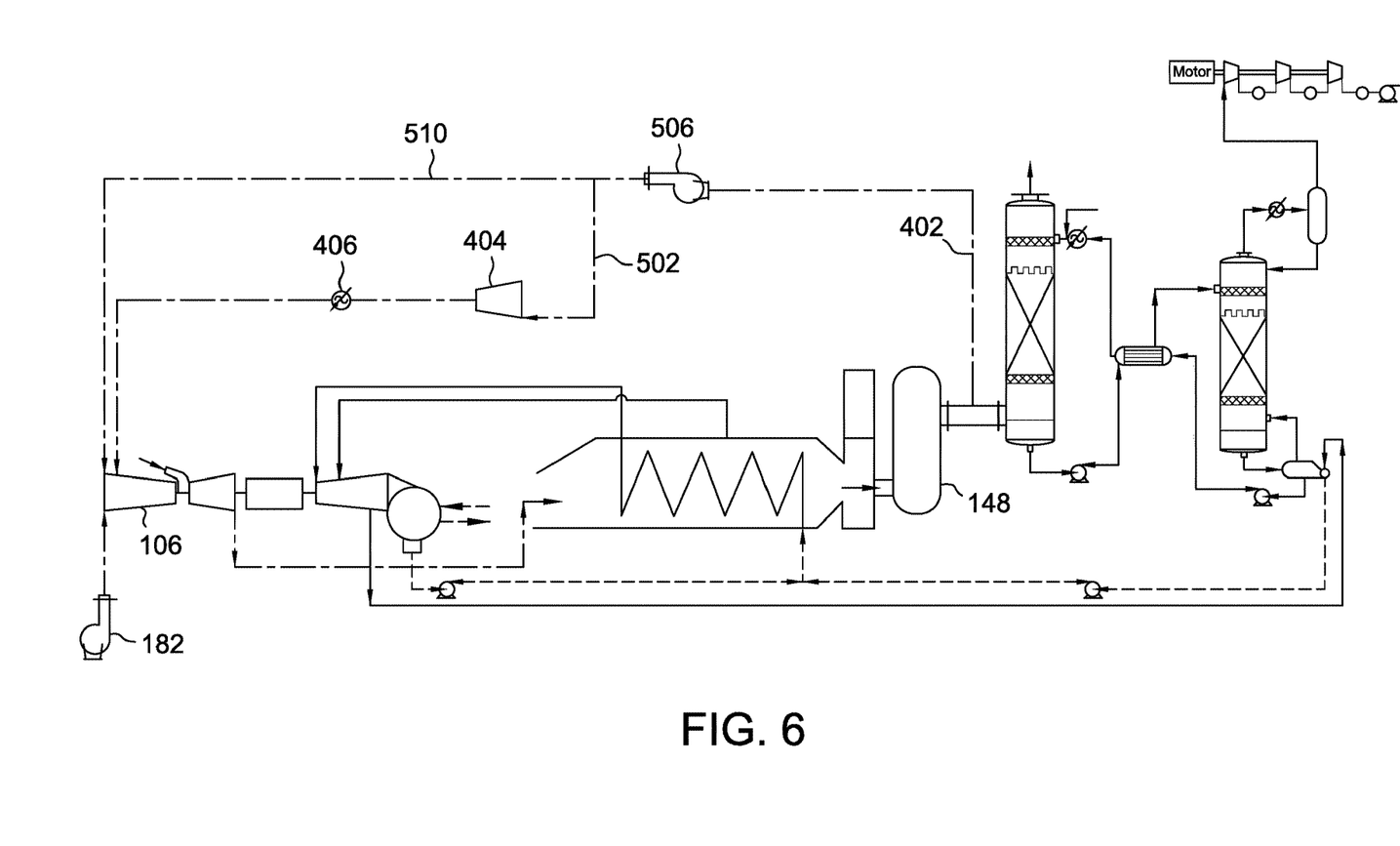
FIG. 6 is a schematic illustration of a further alternative combined cycle power plant including a gas turbine assembly.

FIG. 5 is a schematic illustration of another alternative combined cycle power plant 100 including a gas turbine assembly 102. FIG. 6 is a schematic illustration of yet a further alternative combined cycle power plant 100 including a gas turbine assembly 102. Each alternative embodiment is similar to the embodiment illustrated in FIG. 1, with the differences noted below, and as such, the same reference numbers are used in FIGS. 5 and 6 as were used in FIG. 1.

In FIG. 5, plant 100 utilizes exhaust gas recirculation 402 with post carbon capture system 134. Moreover, in the exemplary embodiment illustrated in FIG. 5, generally plant 100 uses an aftercooled compressed exhaust gas recirculation admission channeled to the main gas turbine, combined with exhaust gas recirculation to the gas turbine inlet. More specifically, an exhaust gas recirculation stream 402 is drawn downstream from first cooler 148 and a portion 502 is channeled towards an exhaust gas recirculation compressor 404. A cooler 406 is coupled between recirculation compressor 404 and interstage inlet 172. Cooler 406 cools the pressurized air discharged from compressor 404 to define a cooled admission stream 180. More specifically, cooler 406 discharges cooled stream 180 towards interstage inlet 172 to facilitate improving the performance of plant 100, as described herein.

The remaining portion 504 of exhaust gas recirculation stream 402 drawn downstream from cooler 148 is channeled towards an exhaust gas boost blower 506. Boost blower 506 discharges a pressurized and cooled flow 510 towards compressor inlet 168. In the exemplary embodiment, because stream 402 is drawn from downstream from cooler 148, the exhaust stream has been scrubbed and cooled. The combination of exhaust gas recirculation compressor 404 and exhaust gas blower 506 facilitates maximizing the total exhaust gas recirculation flow with the use of existing gas turbines within plant 100. More specifically, in the exemplary embodiment of FIG. 5, because the exhaust gas boost blower 506 is combined or paired with the inlet air boost blower 182, gas turbine compressor 106 can operate with an inlet pressure that is greater than ambient or atmospheric pressure such that plant power output is facilitated to be optimized.

Moreover, the embodiment shown in FIG. 5 also enables any losses associated with stream extraction to the carbon capture system 134 to be overcome. More specifically, within the plant embodiment illustrated in FIG. 5, plant 100 is sufficiently pressurized such that any plant output losses associated with operating the carbon capture system 134 are overcome.

The embodiment illustrated in FIG. 6 is similar to the embodiment illustrated in FIG. 5, however the exhaust gas recirculation compressor draws exhaust gas recirculation 502 from downstream of exhaust gas boost blower 506 rather than before stream 402 enters blower 506 as is shown in FIG. 5. Such an embodiment may facilitate simplifying exhaust gas recirculation flow control and thus facilitate reducing overall plant costs since compressor 404 and its associated piping may be located physically closer to turbine assembly 102.

The embodiments described herein relate to providing cooled ambient air or recirculated exhaust gas admission to a gas turbine compressor admission. Conventional exhaust gas recirculation heats the gas turbine inlet, thus reducing the density of working fluid flow entering the compressor and thus, gas turbine and plant output. Compressor exit temperature can also be limited and/or controlled using the cooled interstage admission and control scheme described herein. Accordingly, the embodiments described herein facilitate power augmentation, a reduction in the physical size of exhaust recirculation piping/duct, and a reduced gas temperature within, and at the discharge of, the compressor.

Further aspects of the present disclosure are provided by the subject matter of the following clauses:

1. A combined cycle power plant comprising: a gas turbine engine comprising a compressor having a compressor inlet, a compressor outlet, and an interstage inlet defined therebetween, the gas turbine engine further comprising a turbine outlet configured to discharge a first exhaust gas stream therefrom; a heat recovery steam generator configured to: receive the first exhaust gas stream therein; extract heat from the first exhaust gas stream; and discharge a second exhaust gas stream therefrom; a recirculation compressor configured to selectively pressurize a first portion of the second exhaust gas stream for recirculation towards the compressor; and a first cooler configured to cool the first portion of the second exhaust gas stream after compression, thereby defining a cooled exhaust gas stream, wherein the first cooler discharges the cooled exhaust gas stream to the interstage inlet of the compressor.

2. The combined cycle power plant in accordance with the preceding clause further comprising: a steam turbine configured to discharge a steam stream therefrom; a carbon capture system configured to receive the steam stream; and a controller configured to: monitor power consumption of the recirculation compressor; determine steam cycle losses resulting from channeling the steam stream towards the carbon capture system; and modulate the flow and temperature of the first portion of the second exhaust gas stream recirculated towards the compressor to facilitate increasing the output of the combined cycle power plant.

3. The combined cycle power plant in accordance with any preceding clause further comprising a controller configured to: monitor a temperature of a compressor discharge stream at the compressor outlet; and modulate the flow of cooled exhaust gas provided to the interstage inlet to facilitate maintaining the temperature of the compressor discharge stream within a predefined temperature range.

4. The combined cycle power plant in accordance with any preceding clause further comprising an exhaust gas recirculation line configured to channel a second portion of the second exhaust gas stream towards the compressor inlet.

5. The combined cycle power plant in accordance with any preceding clause further comprising a splitter configured to separate the second exhaust gas stream into the first portion, the second portion, and a third portion, the splitter sized to define the first portion from between about 5% to about 10% of the second exhaust gas system, the second portion from less than about 40% of the second exhaust gas stream, and the third portion from a remainder, by mass of the second exhaust gas stream.

6. The combined cycle power plant in accordance with any preceding clause further comprising a carbon capture system configured to receive the third portion of the second exhaust gas stream.

7. The combined cycle power plant in accordance with any preceding clause further comprising a second cooler between the heat recovery steam generator and the carbon capture system, the second cooler configured to cool the third portion of the second exhaust gas stream channeled towards the carbon capture system.

8. The combined cycle power plant in accordance with any preceding clause further comprising: an exhaust gas boost blower configured to channel the second exhaust gas stream towards a recirculation compressor; and a splitter configured to separate the second exhaust gas stream discharged from the exhaust gas boost blower into the first portion channeled towards—the recirculation compressor and a second portion channeled towards the compressor inlet.

9. A gas turbine assembly comprising: a gas turbine engine comprising a compressor having a compressor inlet, a compressor outlet, and an interstage inlet defined therebetween, the gas turbine engine further comprising a turbine outlet configured to discharge a first exhaust gas stream therefrom; an admission compressor configured to pressurize one of an exhaust gas stream for recirculation towards the compressor and an ambient air stream channeled towards the compressor; and a first cooler configured to cool the compressed flow discharged from the admission compressor, thereby defining a pressurized cooled stream, wherein the first cooler discharges the pressurized cooled stream to the interstage inlet of the compressor.

10. A gas turbine assembly in accordance with the preceding clause further comprising an external inlet boost blower configured to selectively pressurize an ambient airflow stream prior to the airflow stream being discharged towards the compressor inlet.

11. A gas turbine assembly in accordance with any preceding clause further comprising an inlet boost compressor rotatably coupled to the compressor, the inlet boost compressor configured to pressurize an ambient airflow stream discharged towards the compressor inlet.

12. The combined cycle power plant in accordance with any preceding clause further comprising a controller configured to: monitor a temperature of a compressor discharge stream at the compressor outlet; and modulate at least one of the flow and a temperature of the cooled stream provided to the compressor interstage inlet to facilitate maintaining the temperature of the compressor discharge stream within a predefined temperature range.

13. A gas turbine assembly in accordance with any preceding clause further comprising one of an external inlet boost blower configured to selectively supercharge the gas turbine assembly and a shaft-driven inlet boost compressor configured to selectively supercharge the gas turbine assembly.

14. A combined cycle power plant comprising: a gas turbine engine comprising a compressor having a compressor inlet, a compressor outlet, and an interstage inlet defined therebetween, the gas turbine engine further comprising a turbine outlet configured to discharge a first exhaust gas stream therefrom; a heat recovery steam generator configured to: receive the first exhaust gas stream therein; extract heat from the first exhaust gas stream; and discharge a second exhaust gas stream therefrom; at least one of: a recirculation compressor configured to selectively pressurize a first portion of the second exhaust gas stream for recirculation towards the compressor; and an admission compressor configured to pressurize an ambient airflow stream towards the compressor; and a first cooler configured to cool at least one of the ambient airflow stream or the first portion of the second exhaust gas stream after compression, thereby defining a cooled exhaust gas stream, wherein the first cooler discharges the cooled exhaust gas stream to the interstage inlet of the compressor.

15. The combined cycle power plant in accordance with the preceding clause further comprising: an ambient airflow blower configured to pressurize an ambient airflow stream channeled towards the compressor inlet; a steam turbine configured to discharge a steam stream therefrom; a carbon capture system configured to receive the steam stream; a controller configured to: monitor power consumption of one of the recirculation compressor and the admission compressor; determine steam cycle losses resulting from discharging the steam stream towards the carbon capture system; and modulate the flow of at least one of the ambient airflow stream or the first portion of the second exhaust gas stream channeled towards either the compressor or the ambient airflow blower pressurizing an ambient airflow stream towards the compressor to facilitate increasing the output of the combined cycle power plant.

16. The combined cycle power plant in accordance with any preceding clause further comprising a controller configured to: monitor a compressor discharge temperature at the compressor outlet; and modulate at least one of the flow and a temperature of one of the cooled recirculated exhaust gas provided to the compressor interstage inlet or the cooled ambient airflow stream provided to the interstage inlet to facilitate maintaining the compressor discharge temperature within a predefined temperature range.

17. The combined cycle power plant in accordance with any preceding clause further comprising an exhaust gas recirculation line configured to channel the second exhaust gas stream towards the compressor inlet.

18. The combined cycle power plant in accordance with any preceding clause further comprising a splitter configured to separate the second exhaust gas stream into the first portion, the second portion, and a third portion, the splitter sized to define the first portion from between about 5% to about 10% of the second exhaust gas stream, the second portion from less than about 40% of the second exhaust gas stream, and the third portion from a remainder, by mass of the second exhaust gas stream.

19. The combined cycle power plant in accordance with any preceding clause further comprising a carbon capture system configured to receive the third portion of the second exhaust gas stream.

20. The combined cycle power plant in accordance with any preceding clause further comprising a second cooler located upstream from the splitter.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems and methods described herein are not limited to the specific embodiments described herein, but rather components of the various systems may be utilized independently and separately from other systems and components described herein. For example, the cooled interstage admission can be implemented and utilized in connection with any application where enhanced output is desired.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A combined cycle power plant comprising:
   a gas turbine engine comprising a compressor having a compressor inlet, a compressor outlet, and an interstage inlet defined therebetween, the gas turbine engine further comprising a turbine outlet configured to discharge a first exhaust gas stream therefrom;
   a heat recovery steam generator configured to:
      receive the first exhaust gas stream therein;
      extract heat from the first exhaust gas stream; and
      discharge a second exhaust gas stream therefrom;
   a recirculation compressor configured to selectively pressurize a first portion of the second exhaust gas stream for recirculation towards the compressor;
   a first cooler configured to cool the first portion of the second exhaust gas stream after compression, thereby defining a cooled exhaust gas stream, wherein the first cooler discharges the cooled exhaust gas stream to the interstage inlet of the compressor; and
   a controller configured to modulate the flow and temperature of the first portion of the second exhaust gas stream recirculated towards the compressor to facilitate increasing the output of the combined cycle power plant.

2. The combined cycle power plant in accordance with claim 1 further comprising:
   a steam turbine configured to discharge a steam stream therefrom; and
   a carbon capture system configured to receive the steam stream; wherein
   the controller is further configured to:
      monitor power consumption of the recirculation compressor; and
      determine steam cycle losses resulting from channeling the steam stream towards the carbon capture system.

3. The combined cycle power plant in accordance with claim 1 wherein the controller is further configured to:
   monitor a temperature of a compressor discharge stream at the compressor outlet; and
   modulate the flow of cooled exhaust gas provided to the interstage inlet to facilitate maintaining the temperature of the compressor discharge stream within a predefined temperature range.

4. The combined cycle power plant in accordance with claim 1 further comprising an exhaust gas recirculation line configured to channel a second portion of the second exhaust gas stream towards the compressor inlet.

5. The combined cycle power plant in accordance with claim 4 further comprising a splitter configured to separate the second exhaust gas stream into the first portion, the second portion, and a third portion, the splitter sized to define the first portion from between about 5% to about 10% of the second exhaust gas system, the second portion from less than about 40% of the second exhaust gas stream, and the third portion from a remainder, by mass of the second exhaust gas stream.

6. The combined cycle power plant in accordance with claim 5 further comprising a carbon capture system configured to receive the third portion of the second exhaust gas stream.

7. The combined cycle power plant in accordance with claim 6 further comprising a second cooler between the heat recovery steam generator and the carbon capture system, the second cooler configured to cool the third portion of the second exhaust gas stream channeled towards the carbon capture system.

8. The combined cycle power plant in accordance with claim 1 further comprising:
   an exhaust gas boost blower configured to channel the second exhaust gas stream towards the recirculation compressor; and
   a splitter configured to separate the second exhaust gas stream discharged from the exhaust gas boost blower into the first portion channeled towards the recirculation compressor and a second portion channeled towards the compressor inlet.

9. A gas turbine assembly comprising:
   a gas turbine engine comprising a compressor having a compressor inlet, a compressor outlet, and an interstage inlet defined therebetween, the gas turbine engine further comprising a turbine outlet configured to discharge a first exhaust gas stream therefrom;
   an admission compressor configured to pressurize a stream channeled towards the compressor, wherein the stream is a portion of the first exhaust gas stream;
   a first cooler configured to cool the compressed flow discharged from the admission compressor, thereby defining a pressurized cooled stream, wherein the first cooler discharges the pressurized cooled stream to the interstage inlet of the compressor; and
   a controller configured to modulate, using the admission compressor and the first cooler, the flow and a temperature of the cooled stream provided to the compressor interstage inlet to facilitate maintaining the temperature of the stream discharged from the admission compressor within a predefined temperature range and increasing the output of the gas turbine engine.

10. The gas turbine assembly in accordance with claim 9 further comprising an external inlet boost blower configured to selectively pressurize an ambient airflow stream prior to the airflow stream being discharged towards the compressor inlet.

11. The gas turbine assembly in accordance with claim 9 further comprising an inlet boost compressor rotatably coupled to the compressor, the inlet boost compressor configured to pressurize an ambient airflow stream discharged towards the compressor inlet.

12. The in accordance with claim 9 wherein the controller is further configured to:
monitor a temperature of a compressor discharge stream at the compressor outlet.

13. The gas turbine assembly in accordance with claim 9 further comprising one of an external inlet boost blower configured to selectively supercharge the gas turbine assembly and a shaft-driven inlet boost compressor configured to selectively supercharge the gas turbine assembly.

14. A combined cycle power plant comprising:
a gas turbine engine comprising a compressor having a compressor inlet, a compressor outlet, and an interstage inlet defined therebetween, the gas turbine engine further comprising a turbine outlet configured to discharge a first exhaust gas stream therefrom;
a heat recovery steam generator configured to:
receive the first exhaust gas stream therein;
extract heat from the first exhaust gas stream; and
discharge a second exhaust gas stream therefrom;
at least one of:
a recirculation compressor configured to selectively pressurize a first portion of the second exhaust gas stream for recirculation towards the compressor; or
an admission compressor configured to pressurize an ambient airflow stream towards the compressor;
a first cooler configured to cool an ambient airflow stream or the first portion of the second exhaust gas stream after compression, thereby defining a cooled stream, wherein the first cooler discharges the cooled stream to the interstage inlet of the compressor; and
a controller configured to modulate the flow of at least one of the ambient airflow stream or the first portion of the second exhaust gas stream channeled towards either the compressor or an ambient airflow blower pressurizing an ambient airflow stream towards the compressor to facilitate increasing the output of the combined cycle power plant.

15. The combined cycle power plant in accordance with claim 14 further comprising:
a steam turbine configured to discharge a steam stream therefrom;
a carbon capture system configured to receive the steam stream;
a controller configured to:
monitor power consumption of one of the recirculation compressor and the admission compressor; and
determine steam cycle losses resulting from discharging the steam stream towards the carbon capture system.

16. The combined cycle power plant in accordance with claim 14 wherein the controller is further configured to:
monitor a compressor discharge temperature at the compressor outlet; and
modulate at least one of the flow and a temperature of one of the cooled recirculated exhaust gas provided to the compressor interstage inlet or the cooled ambient airflow stream provided to the interstage inlet to facilitate maintaining the compressor discharge temperature within a predefined temperature range.

17. The combined cycle power plant in accordance with claim 14 further comprising an exhaust gas recirculation line configured to channel the second exhaust gas stream towards the compressor inlet.

18. The combined cycle power plant in accordance with claim 17 further comprising a splitter configured to separate the second exhaust gas stream into the first portion, the second portion, and a third portion, the splitter sized to define the first portion from between about 5% to about 10% of the second exhaust gas stream, the second portion from less than about 40% of the second exhaust gas stream, and the third portion from a remainder, by mass of the second exhaust gas stream.

19. The combined cycle power plant in accordance with claim 18 further comprising a carbon capture system configured to receive the third portion of the second exhaust gas stream.

20. The combined cycle power plant in accordance with claim 19 further comprising a second cooler located upstream from the splitter.

* * * * *